US007802889B2

(12) United States Patent
Liao et al.

(10) Patent No.: US 7,802,889 B2
(45) Date of Patent: Sep. 28, 2010

(54) COLOR WHEEL MODULE FOR A PROJECTION APPARATUS

(75) Inventors: Long-Sheng Liao, Hsinchu (TW); Sung-Nan Chen, Hsinchu (TW); Yi-Hsueh Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 540 days.

(21) Appl. No.: 11/541,608

(22) Filed: Oct. 3, 2006

(65) Prior Publication Data

US 2007/0102637 A1 May 10, 2007

(30) Foreign Application Priority Data

Nov. 8, 2005 (TW) .............................. 94219321 U

(51) Int. Cl.
*H04N 9/12* (2006.01)
*G03B 21/14* (2006.01)
*G02B 5/22* (2006.01)

(52) U.S. Cl. .......................... 353/34; 359/889; 348/743

(58) Field of Classification Search ................... 353/84, 353/20, 31; 359/889, 885; 348/743; 356/418, 356/416; 250/503.1
See application file for complete search history.

(56) References Cited

U.S. PATENT DOCUMENTS

| | | | | |
|---|---|---|---|---|
| 5,555,106 | A * | 9/1996 | Hsu | 358/512 |
| 6,024,453 | A * | 2/2000 | Edlinger et al. | 353/84 |
| 6,811,267 | B1 * | 11/2004 | Allen et al. | 353/122 |
| 7,052,146 | B2 * | 5/2006 | Esterberg et al. | 353/119 |
| 7,199,952 | B2 * | 4/2007 | Niwa et al. | 359/892 |
| 7,367,678 | B2 * | 5/2008 | Kobayashi | 353/31 |
| 2003/0128000 | A1 * | 7/2003 | Nakanishi | 315/408 |

* cited by examiner

*Primary Examiner*—Georgia Y Epps
*Assistant Examiner*—Ryan Howard
(74) *Attorney, Agent, or Firm*—Birch, Stewart, Kolasch & Birch, LLP

(57) ABSTRACT

A color wheel module includes a color wheel having a side face defining a plurality of color regions and a detection region, a light source for emitting light beams toward the side face of the color wheel and a light detection device for detecting the light beams from the color regions and the detection region in order to locate position of the color regions and the detection region.

13 Claims, 2 Drawing Sheets

COLOR WHEEL MODULE FOR A PROJECTION APPARATUS

FIELD OF THE INVENTION

The invention relates to a color wheel module, and more particularly to a color wheel module for use in a projection apparatus.

BACKGROUND OF THE INVENTION

Referring to FIGS. 1A and 1B, a conventional color wheel module 2 for use in a projection apparatus includes a spindle, a color wheel 4 mounted on the spindle, a motor 6 for driving the spindle and thus the color wheel 4, and a carrier bracket 8 for holding the motor 6. The color wheel 4 has a plurality of color regions 402. The color wheel 4 generally has 6 numbers of equidistant color regions 402, such as Red, Green and Blue. Since a light valve (not shown) is required to complement with the color regions 402 in the color wheel 4 in order to transform light beams into image beams, the rotation speed of the color wheel 4 is controlled in conformance with the switching speed of the light valve.

In order to ensure the rotation speed of the color wheel 4, a timing mark 10 is usually disposed on a lateral side 602 of the motor casing such that the timing mark 10 is aligned with an adjoining area between adjacent two color regions 402,404. A light source 12 and a detection device 14 are mounted on the carrier bracket 8. The timing mark 10 is generally black.

The light source 12 emits the light beams, Infra-red ray (IR) for example, ceaselessly onto the lateral side 602 of the motor casing which is kept under constant rotation. Because, the lateral side 602 is coated with silver to reflect the light beams, the detection device 14 is capable of detecting the reflected light beams. During rotation of the color wheel 4, the detection device 14 is unable to detect the reflected light beams once the light beams projecting on the timing mark 10, since black has poor reflection ability even cannot reflect the light beam. Under this condition, the position of the respective color region 402 in the color wheel 4 is located, thereby controlling the rotation speed of the color wheel 4.

It is noted that mounting of the timing mark 10 on the lateral side 602 of the motor casing is done manually. It is time wasting and lacks accuracy in the position. In the prior art, some control software is used to adjust the position of the timing mark 10 on the motor casing with respect to the light valve. However, employment of the software results in extra expense as well as time waste.

SUMMARY OF THE INVENTION

It is an object of the present invention to provide a color wheel module for use in a projection apparatus such that the color wheel module is capable of enhancing the detection ability of the light beams, thereby economizing the production cost.

In one aspect of the present invention, a color wheel module provided for use in a projection apparatus includes a color wheel having a side face defining a plurality of color regions and a detection region, a light source for emitting light beams toward the side face of the color wheel, and a light detection device for detecting the light beams from the side face after projecting on the color regions and the detection region in order to locate position of the color regions and the detection region.

The detection region is formed simultaneously during the formation of the color regions on the side face of the color wheel so as to replace the timing mark of the prior art color wheel.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTIONS OF THE PREFERRED EMBODIMENTS

Figure 1A:
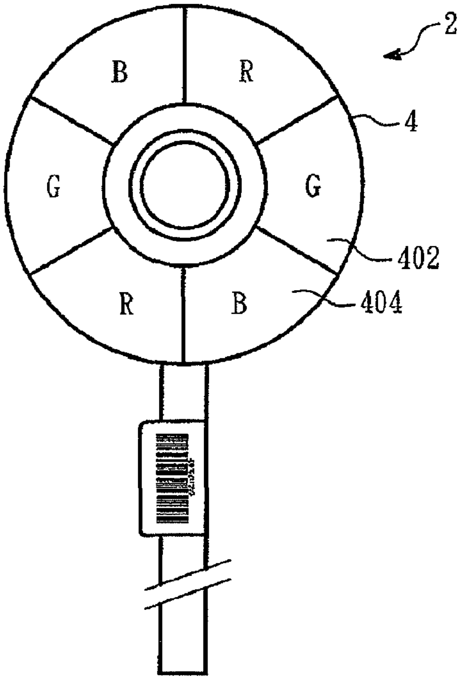
FIGS. 1A and 1B respectively show front and lateral side views of a conventional color wheel for use in a projection apparatus.
Figure 1B:
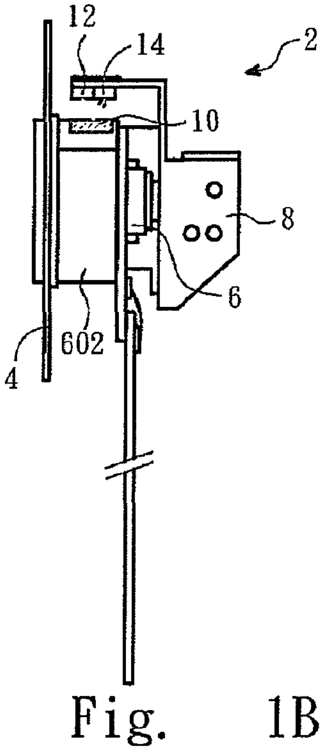
Figure 2A:
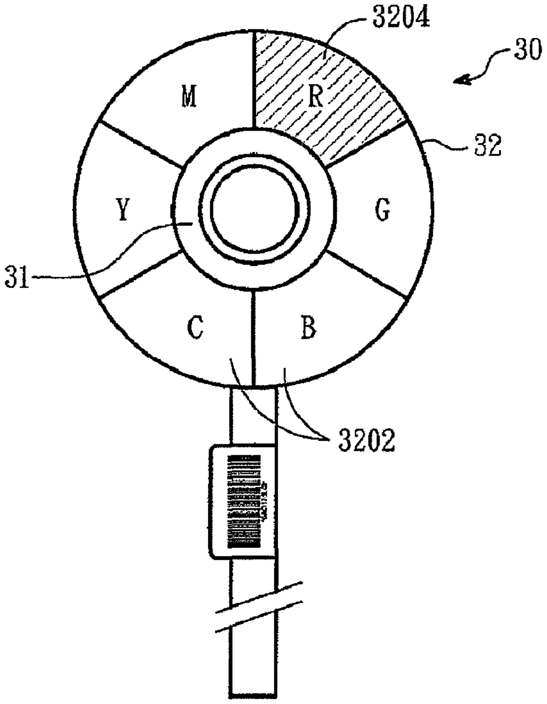
FIGS. 2A and 2B respectively show front and lateral side views of a color wheel module for use in a projection apparatus according to a first embodiment of the present invention.
Figure 2B:
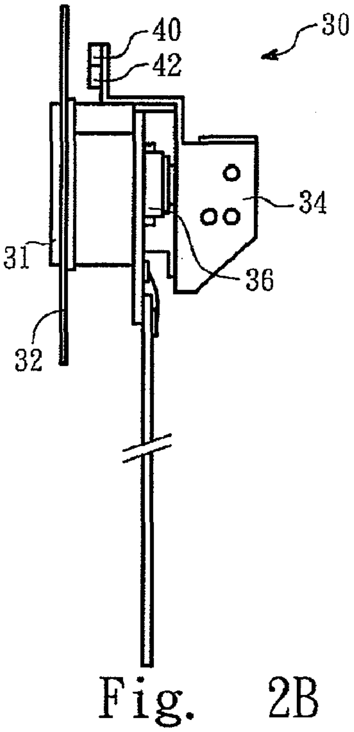

Referring to FIGS. 2A and 2B, a color wheel module 30 includes a retainer 31, a color wheel 32, a carrier bracket 34, a motor 36, a light source 40 and a detection device 42. The motor 36 has an output shaft. The color wheel 32 is co-axially mounted to the output shaft of the motor 36 so as to be driven thereby. The motor 36, the light source 40 and the detection device 42 are mounted on the carrier bracket 34.

The color wheel 32 has a side face 320 defining a plurality of color regions 3202 and a detection region 3204. The color regions 3202 are formed by coating. In the same manner, the detection region 3204 is formed by coating.

The light source 40 is disposed at a position in alignment with the side face 320 of the color wheel 32, and is capable of generating light beams toward the color regions 3202 in the color wheel 32. The detection device 42 is capable of detecting the light beams from the side face of the color wheel 32 after projecting on the color regions 3202 and the detection region 3204 in order to locate the respective position of each of the color regions 3202 and the detection region 3204.

In the first embodiment of the color wheel module 30, the color wheel 32 has a rear side defining the side face and a front side opposite to the rear side. The light source 40 and the light detection device 42 are disposed behind the rear side of the color wheel 32. The detection device 42 is used for detecting the reflected light beams from the detection region 3204 in the rear side of the color wheel 32. In this embodiment, there are six color regions 3202 in the rear side of the color wheel 32, namely, R (red), G (green), B (blue), C (cyan), Y (yellow) and M (magenta). The red region 3202 serves as the detection region 3204 in the first embodiment such that the detection region 3204 is located between adjacent two of the color regions 3202 (i.e. M and G). The detection region 3204 has a wavelength range. A wavelength range of the light beams emitted from the light source 40 is red light beam to Infra-red ray (IR). The IR is capable of penetrating through the detection region 3204.

The light source 40 emits the light beams toward the color wheel 32 as the latter is kept under constant rotation. The detection device 42 is capable of detecting the light beams reflected by the color regions 3202. Once the light beams emitted from the light source 40 project onto the detection region 3204, the detection device 42 is unable to detect the reflected light beams since the light beams are capable of penetrating through the detection region 3204.

Figure 3A:
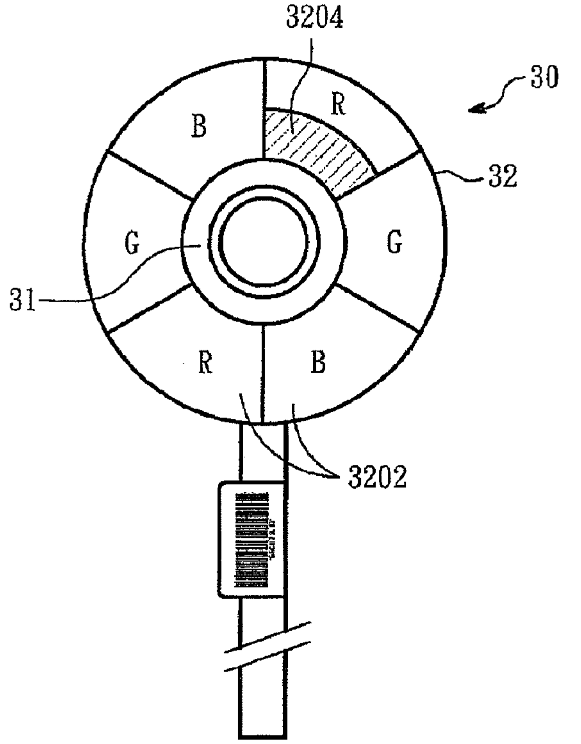
FIGS. 3A and 3B respectively show front and lateral side views of the color wheel module for use in a projection apparatus according to a second embodiment of the present invention.
Figure 3B:
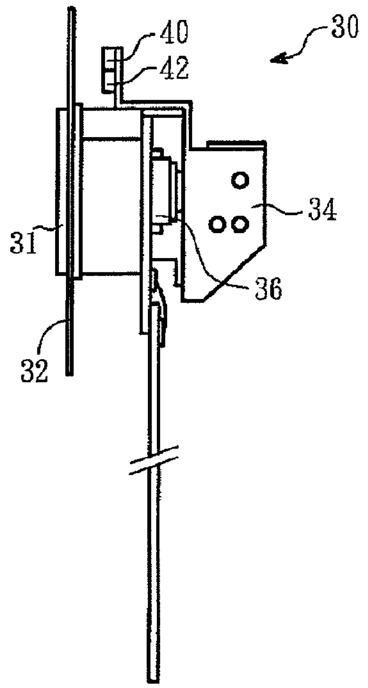

FIGS. 3A and 3B, respectively show front and lateral side views of the color wheel module 30 according to a second embodiment of the present invention. The second embodiment has the structure similar to that of the first embodiment, except in that the rear side 320 of the color wheel 32 is formed with a center axis. The detection region 3204 has a sector configuration with a dimension smaller one of the color regions 3202 and is disposed in said one of the color regions 3202 close to the center axis. Preferably, the detection region 3204 is coated with black. The light source 40 generates an IR or visual light beams. The color regions 3202 reflect the light beams so that the detection device 42 detects the reflected light beams. However, the detection device 42 is unable to detect the light beams since the IR is absorbed by the detection regions 3204 (being black) in the rear side of the color wheel 32. Under this condition, the projection apparatus equipped with the color wheel module 30 of the present invention is capable of locating the precise position of the respective region in the rear side of the color wheel 32. Further, a retainer 31 is shown in FIGS. 3A and 3B.

Besides, in the second embodiment, the detection region 3204 can be transparent. The light source 40 generates an IR or visual light beams. The color regions 3202 reflect the light beams so that the detection device 42 detects the reflected light beams. However, the detection device 42 is unable to detect the light beams since the IR passes through the detection regions 3204 (being transparent) in the rear side of the color wheel 32. Under this condition, the projection apparatus equipped with the color wheel module 30 of the present invention is capable of locating the precise position of the respective region in the rear side of the color wheel 32.

Figure 4A:
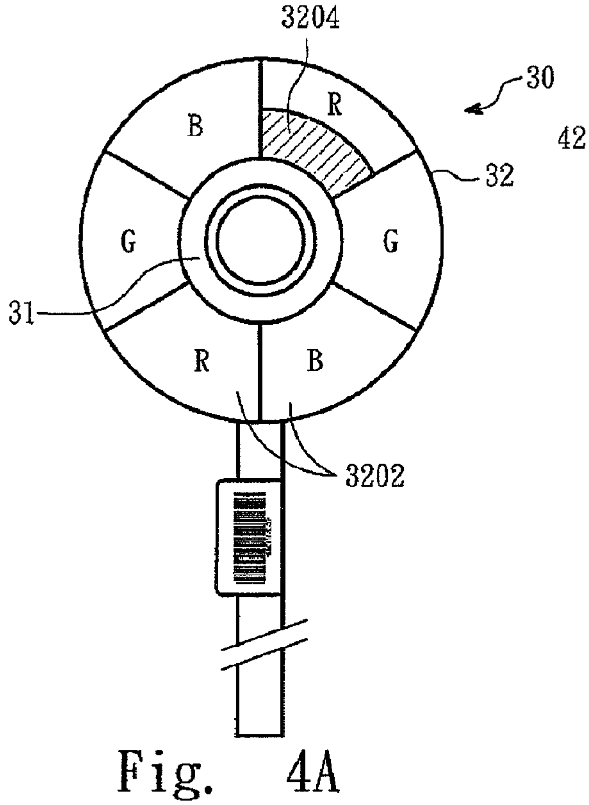
FIGS. 4A and 4B respectively show front and lateral side views of the color wheel module for use in a projection apparatus according to a third embodiment of the present invention.
Figure 4B:
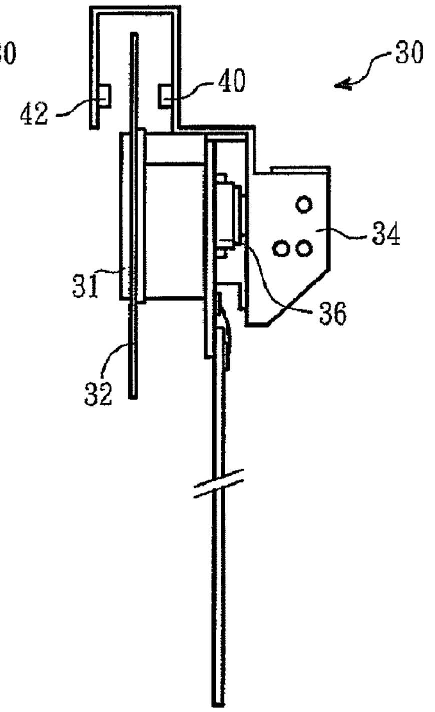

FIGS. 4A and 4B respectively show front and lateral side views of the color wheel module for use in a projection apparatus according to a third embodiment of the present invention. The third embodiment has the structure similar to that of the second embodiment, except in that the light source 40 is disposed behind the rear side of the color wheel 32 while the light detection device 42 is disposed in front of the front side of the color wheel 32. The light source 40 generates an IR. The IR is reflected by the color regions 3202 (without penetrating the color regions 3202) so that the detection device 42 can detect the reflected light beams. However, the detection device 42 is unable to detect the IR since the IR passes through the detection regions 3204 (being transparent) in the rear side of the color wheel 32. Under this condition, the projection apparatus equipped with the color wheel module 30 of the present invention is capable of locating the precise position of the respective region in the rear side of the color wheel 32. Further, a retainer 31 is shown in FIGS. 4A and 4B.

Note that the color wheel module 30 of the present invention is used in the projection apparatus (not shown). The detection region 3204 is formed simultaneously during the formation of the color regions 3202 on the rear side of the color wheel 32 so as to replace the timing mark of the prior art color wheel. Thus, the problem of inaccuracy of the position caused due to manually forming the timing mark on the motor casing of the prior art is consequently eliminated.

To summarize the above paragraphs, it is observable that due to employment of the color wheel module 32 in the projection apparatus, the detection ability of the apparatus is enhanced.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A color wheel module for a projection apparatus, comprising:

a color wheel having a side face defining a plurality of color regions, a retainer, and a detection region on said plurality of color regions;

wherein a distance between said detection region and a center of said side face is bigger than a radius of said retainer, and a distance between said detection region and said center of said side face is smaller than an outer radius of said color region;

a light source for emitting light beams toward said detection region; and a light detection device for detecting said light beams from said side face in order to locate position of said color regions and said detection region.

2. The color wheel module according to claim 1, wherein said color wheel has a rear side defining said side face and a front side opposite to said rear side, said light source and said light detection device being disposed behind said rear side of said color wheel.

3. The color wheel module according to claim 2, wherein one of said color regions defines said detection region, said detection region having a wavelength range, said light beams emitted from said light source capable of penetrating through said detection region within said wavelength range.

4. The color wheel module according to claim 3, wherein said wavelength range of said light beams emitted from said light source is red light beam to Infra-red ray (IR).

5. The color wheel module according to claim 1, wherein said side face of said color wheel is formed with a center axis, said detection region having a sector configuration with a dimension smaller than one of said color regions and disposed adjacent to said center axis.

6. The color wheel module according to claim 5, wherein said color wheel has a rear side defining said side face and a front side opposite to said rear side, said light source and said light detection device being disposed behind said rear side of said color wheel.

7. The color wheel module according to claim 6, wherein said detection region is coated with black.

8. The color wheel module according to claim 6, wherein said detection region is transparent.

9. The color wheel module according to claim 5, wherein said color wheel has a rear side defining said side face and a front side opposite to said rear side, said light source being disposed behind said rear side of said color wheel, said light detection device being disposed in front of said front side of said color wheel.

10. The color wheel module according to claim 9, wherein said detection region is transparent, said light beams emitted from said light source comprises IR for penetrating through said detection region.

11. The color wheel module according to claim 1, further comprising a motor for driving said color wheel and a carrier bracket, said light source and said detection device being mounted on said carrier bracket.

12. The color wheel module according to claim 1, wherein said detection region is formed on said side face of said color wheel by coating.

13. The color wheel module according to claim 1, wherein said color wheel further comprises a motor for driving said color wheel, and said light source is disposed at a predetermined position that a distance between said light source and an axis of said motor is bigger than said radius of said retainer, and a distance between said light source and said axis of said motor is smaller than said outer radius of said color region.

* * * * *